United States Patent
Babb et al.

(10) Patent No.: US 8,752,736 B2
(45) Date of Patent: Jun. 17, 2014

(54) SELF ACTUATING ROTARY DUST VALVE

(75) Inventors: Kevin Brian Babb, Vicksburg, MI (US); Jeremy Metternich, Delray Beach, FL (US)

(73) Assignee: Mann+Hummel GmbH, Ludwigshafen (DE)

( * ) Notice: Subject to any disclaimer, the term of this patent is extended or adjusted under 35 U.S.C. 154(b) by 267 days.

(21) Appl. No.: 12/834,989

(22) Filed: Jul. 13, 2010

(65) Prior Publication Data

US 2011/0012043 A1  Jan. 20, 2011

Related U.S. Application Data

(60) Provisional application No. 61/225,708, filed on Jul. 15, 2009.

(51) Int. Cl.
 *G01F 11/10* (2006.01)
 *B01D 45/18* (2006.01)

(52) U.S. Cl.
 USPC ............ 222/368; 251/304; 55/430; 55/432

(58) Field of Classification Search
 USPC .............. 222/386, 368, 360, 367, 166, 500; 251/304, 305; 55/285, 385.3, 428, 430, 55/432
 See application file for complete search history.

(56) References Cited

U.S. PATENT DOCUMENTS

| | | | | |
|---|---|---|---|---|
| 3,397,515 A | * | 8/1968 | Johnson | 55/302 |
| 3,853,508 A | * | 12/1974 | Gordon et al. | 55/302 |
| 3,895,745 A | * | 7/1975 | Hook | 222/368 |
| 4,076,150 A | * | 2/1978 | Didrickson | 222/368 |
| 4,114,785 A | * | 9/1978 | Dugge | 251/305 |
| 4,179,043 A | * | 12/1979 | Fischer | 222/368 |
| 4,204,849 A | * | 5/1980 | Johnston | 55/310 |
| 4,235,354 A | * | 11/1980 | Aonuma et al. | 222/368 |
| 4,331,459 A | | 5/1982 | Copley | |
| 4,366,878 A | * | 1/1983 | Warf | 180/68.3 |
| 4,388,091 A | * | 6/1983 | Khosropour | 55/337 |
| 4,445,913 A | * | 5/1984 | Nishiyama | 55/302 |
| 5,002,084 A | * | 3/1991 | Wilson | 137/15.24 |
| 5,097,988 A | * | 3/1992 | de Deyne | 222/77 |
| 5,307,963 A | * | 5/1994 | Mitchell | 222/368 |
| 5,765,728 A | * | 6/1998 | Simpson et al. | 222/146.2 |
| 5,772,081 A | * | 6/1998 | Wei et al. | 222/368 |

(Continued)

FOREIGN PATENT DOCUMENTS

| | | | | | |
|---|---|---|---|---|---|
| GB | 2079709 A | * | 1/1982 | | 222/367 |
| JP | 3165807 A | * | 7/1991 | | 222/386 |

*Primary Examiner* — Kevin P Shaver
*Assistant Examiner* — Nicholas J Weiss
(74) *Attorney, Agent, or Firm* — James Hasselbeck

(57) ABSTRACT

The present invention relates to a self actuating rotary dust valve particularly for discharging dust from an engine air cleaner. The rotary dust valve includes a valve body having an inlet port, an outlet port and a rotor chamber interposed therebetween. A rotary dust ejection member is enclosed in the rotor chamber and supported for rotation about a fixed axis. A plurality of fin members are provided angularly spaced about and secured to the hub member. Adjacent pairs of the fin members define at least one dust pocket therebetween to receive dust from the air cleaner to be ejected. The rotor chamber and the fin members are cooperatively shaped and configured to maintain a continuous air lock closure. The dust valve is operable by any of: gravity and vibration to rotate and thereby to discharge the dust buildup through the outlet port or alternately by other drive means.

9 Claims, 3 Drawing Sheets

(56) References Cited

U.S. PATENT DOCUMENTS

| | | | |
|---|---|---|---|
| 6,045,009 A * | 4/2000 | Beirle et al. | 222/368 |
| 6,338,423 B1 * | 1/2002 | Polon | 222/368 |
| 6,779,691 B2 * | 8/2004 | Cheng | 222/368 |
| 6,921,424 B2 * | 7/2005 | Bugli et al. | 55/385.3 |
| 6,966,466 B2 * | 11/2005 | Jensen | 222/368 |
| 7,364,601 B2 * | 4/2008 | Xu et al. | 55/320 |
| 7,491,254 B2 * | 2/2009 | Krisko et al. | 55/337 |
| 7,597,219 B2 * | 10/2009 | O'Leary et al. | 222/368 |
| 7,645,310 B2 * | 1/2010 | Krisko et al. | 55/337 |
| 7,703,639 B2 * | 4/2010 | Landau et al. | 222/1 |
| 7,757,903 B2 * | 7/2010 | Schwartz et al. | 222/368 |
| 2003/0182910 A1 | 10/2003 | Pikesh et al. | |
| 2003/0217534 A1 | 11/2003 | Krisko et al. | |
| 2004/0134171 A1 | 7/2004 | Scott et al. | |
| 2008/0093391 A1 * | 4/2008 | Schwartz et al. | 222/368 |

* cited by examiner

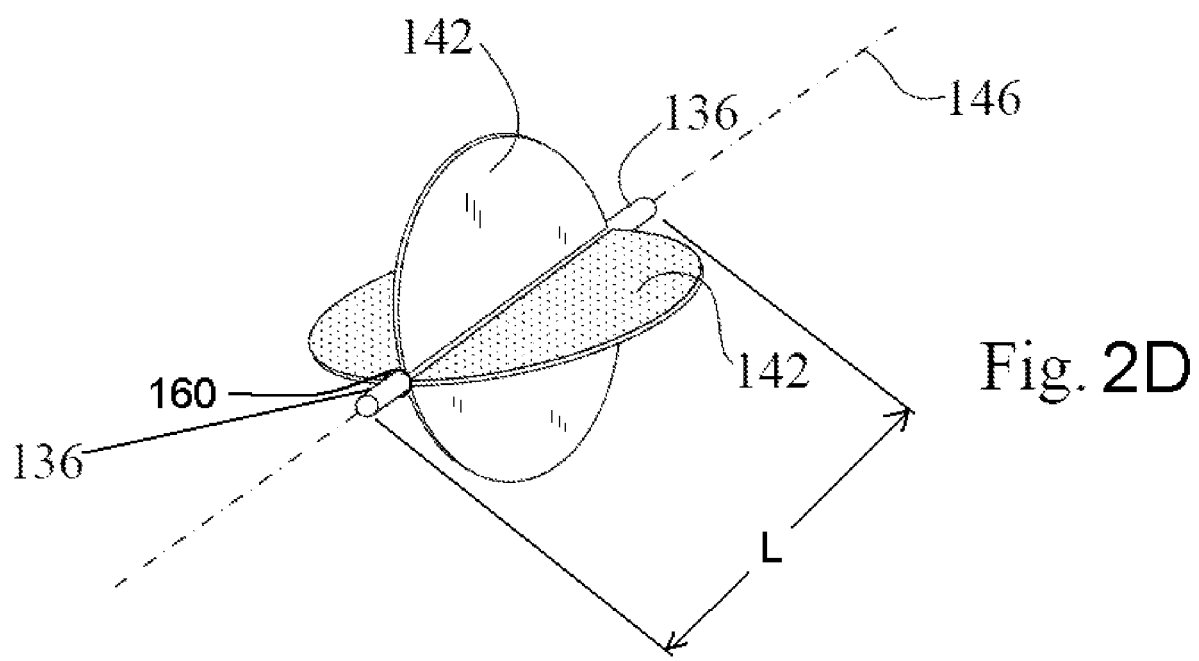

SELF ACTUATING ROTARY DUST VALVE

CROSS REFERENCE TO RELATED APPLICATIONS

This application claims the benefit of U.S. Provisional Patent Application No. 61/225,708, filed Jul. 15, 2009 entitled "SELF ACTUATING ROTARY DUST VALVE" and which is hereby incorporated by reference in its entirety.

TECHNICAL FIELD

The present invention relates to a rotary dust valve and, more particularly, to a self actuating rotary dust valve for discharging dust from a partial vacuum in an engine intake tract into the outside air.

BACKGROUND OF THE INVENTION

Internal combustion engines are typically protected from acquiring dust and debris in the intake combustion air by the presence of an air filter or air cleaner in the air intake tract. When operated in dusty or particulate debris laden environments, dust and debris can quickly accumulate in the air cleaner. Further movement of the debris is blocked by the filtering activity of the air filter, and so accumulated debris must be removed to prevent obstruction of the air cleaner filter element.

As the engine draws combustion air through the intake tract and air cleaner, the air cleaner operates at a slight vacuum relative to outside air pressure. This vacuum works against urging dust and debris to exit the air cleaner through the dust valve as the vacuum will tend to draw dust and debris back into the air cleaner rather than permitting the debris to exit to the outside.

Various types of flap valves are applied as dust valves in the prior art. These valves have lips that are held closed by the vacuum and may be responsive to pressure pulsations in the intake tract, as due to the operation of the engine. In response to momentary pressure fluctuations, such flap valves may momentarily open to discharge dust from within the air cleaner into the environment. If the pressure pulsations are insufficient or the vacuum too strong to permit the flap valve lips to open, then some varieties of the flap valves will open when the engine is shutdown and the vacuum is thereby removed. If the flap valve fails to reliably periodically open (perhaps due to the operating vacuum, insufficient engine air intake pressure pulsations, elastomeric aging or other issues), then dust accumulates in the air cleaner and air filter obstruction is not avoided.

With the advent of tier 4 emission standards, engine manufacturers are providing designs that have a steadier air intake pressure and reduce pressure pulsations; therefore engine intake air pressure pulsations may be insufficient to operate dust removal flap valves and the like.

Additionally the elastomers of elastomeric dust valves can age, lose their resilience or even disintegrate and therefore fail to close or close fully during operation. This is undesirable as drawing outside air in the reverse direction through the dust valve can draw in outside dust and debris and, due to the vacuum in the air intake tract, prevent accumulated debris in the air cleaner or intake tract from being expelled to the environment.

Therefore, there remains a need in the art for a dust valve that avoids elastomeric aging issues, is low in cost, prevents back-flow through the dust valve, is self actuating and is able to eject dust while operating against intake tract vacuum.

SUMMARY OF THE INVENTION

In aspects of the invention a self actuating rotary dust valve is provided. The present invention is particularly beneficial in ejecting dust from an engine air cleaner, and provides a low cost, self actuating, compact and reliable solution. The rotary dust valve includes a valve body having an inlet port, an outlet port and a rotor chamber interposed therebetween. A rotary dust ejection member is enclosed in the rotor chamber and supported for rotation about a fixed axis within the chamber. The axis of rotation is substantially perpendicular to the alignment between the inlet and outlet ports. The rotary dust valve includes a hub member rotatably supported to rotate in the rotor chamber about the axis of rotation. A plurality of fin members are provided angularly spaced about and secured to the hub member. Each fin member extends radially outwards from the hub member. The fin members share a common size and shape and are configured to rotate in unison about the axis. Adjacent pairs of the fin members define at least one dust pocket therebetween to receive dust from the air cleaner to be ejected. The fin members are arranged such that as the fin members rotate about the axis, the dust pockets are caused to open to the inlet port when in a first position and then to open to the outlet port when in a second position. The fin members are configured to open a dust pocket to no more than one of the ports at any time. The rotor chamber and the fin members are cooperatively shaped and configured to maintain a continuous air lock closure between the inlet and outlet port as the fin members rotate about the axis within the chamber, providing pressure and air flow separation between the inlet and outlet ports. The fin members freely rotate in unison about the axis such that dust buildup in the dust pocket in the first position is operable by gravity and/or vibration to rotate the duct pocket with buildup into the second position to discharge the dust buildup through the outlet port.

In another aspect of the invention, the fin members are angularly positioned about the axis for uniform angular displacement between adjacent fin members, relative to the axis of rotation.

In another aspect of the invention, cylindrical shaft portions extend axially from opposing ends of the hub member. The shafts are sized to extend to and receive support from opposing sidewalls of the rotor chamber.

In another aspect of the invention, two pin members are provided, each secured to an opposing sidewall of the rotor chamber. The pins are positioned along the axis of rotation and protrude inwardly along the axis into the chamber. The opposing ends of the hub member each have a bore. The bores are each configured to receive and rotate about a portion of the pins such that the hub member and fin members are free to rotate in the rotor chamber.

In another aspect of the invention, a shaft is provided having a length selected to extend between and receive support from opposing sidewalls of the rotor chamber. The shaft is aligned with the axis and extends through an axially aligned bore in the hub member.

In another aspect of the invention, the hub and fin members rotate in unison upon the shaft.

In another aspect of the invention, the shaft rotatably supports the hub and fin members on the opposing sidewalls such that the shaft, hub and fin members rotate in unison.

In another aspect of the invention, the fin members are substantially planar.

In another aspect of the invention, the fin members may be curved, S-shaped, concave or convex.

In another aspect of the invention, the dust valve is positioned with the inlet port positioned vertically above the outlet port such that the ejection of dust is aided by gravity.

In another aspect of the invention, the inlet port is connected to an air cleaner of an internal combustion engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIGS. 2C and 2D are perspective views of embodiments of exemplary rotary dust ejection members, consistent with the present invention.

Figure 1:
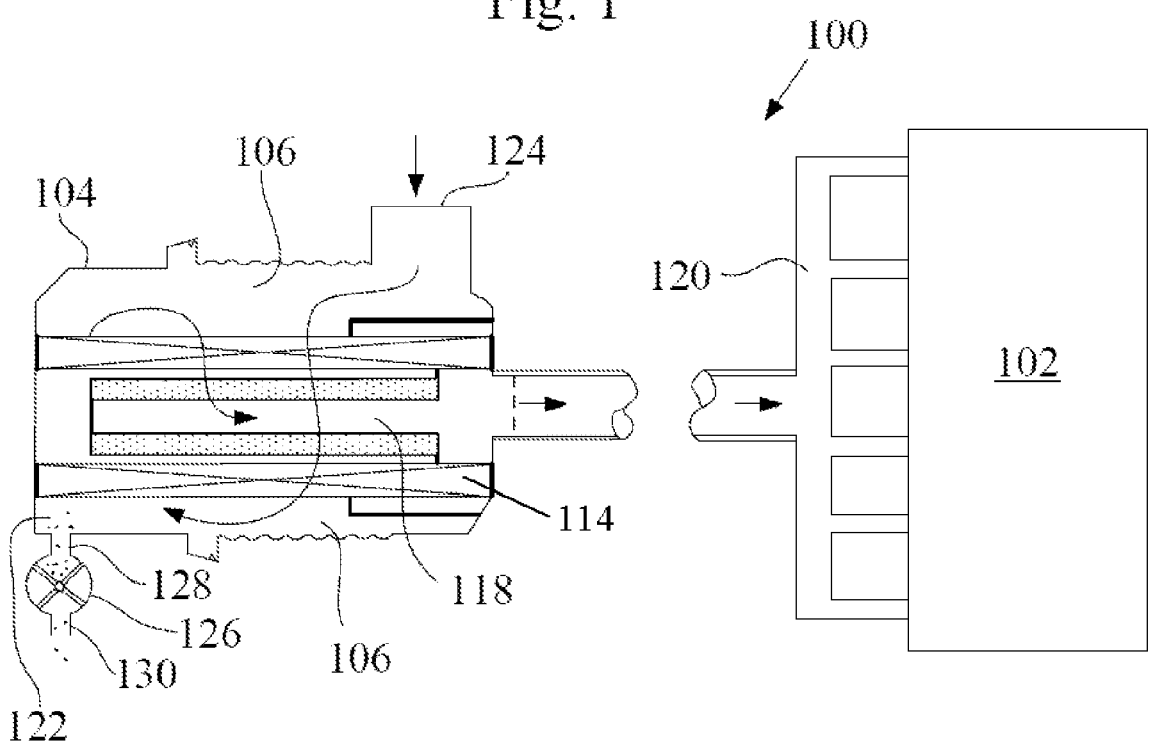
FIG. 1 is a schematic diagram of an air intake tract of an internal combustion engine, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a self actuating rotary dust valve apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic diagram of an air intake tract 100 of an internal combustion engine 102. Air enters the tangential inlet 124 of the air cleaner 104 where, due to the tangential position of inlet 104 the air flow is cause to rotate or torsionally within the dirty side 106 of the air cleaner 104. Due to the torsional air flow, preseparation of some, particularly heavier particulates 122 occurs with the dirty side 106 of the air cleaner 104 before the air flow enters the air filter 114. Air filter 114 includes a filter media adapted to remove additional particulates that were not caught by the preseparation process. Filtered air exits the air filter 114 at the clean side 118 of the air filter 114 and flows along the air intake tract to eventually enter the intake manifold 120 of the internal combustion engine 102.

Particulates 122 present in the combustion air entering the air cleaner 104 are removed by preseparation and filtering and are therefore trapped at the dirty air side 106 of the air cleaner 104 where they may accumulate and eventually occlude portions of the dirty air side 106 of the air cleaner 104. Due to the swirl of the air flow induced by the tangential inlet of the air cleaner 104, perhaps 80-90% of the particulate debris is removed in the preseparation process and accumulates at the bottom of the dirty air side 106 of the air cleaner housing. Debris may accumulate to the point at which the debris contacts and begins to occlude the air filter element 114. As further movement of this particulate debris 122 is blocked by the filtering activity of the air filter 114, it is advantageous to provide a means of automatically removing the particulate debris 122 to prevent obstruction of the air cleaner 104.

During engine operation the air cleaner 104 operates at a lower absolute pressure (slight vacuum) relative to the outside air pressure, this due to the vacuum generated by operation of the engine 102. The air inlet 124 is generally positioned to draw outside air at a location where minimal dust is expected and where it may freely draw upon outside air. The air cleaner 104 is generally positioned within the engine compartment of the vehicle, providing a short air duct run with minimal pressure loss to the engine. It is generally undesirable to draw air from within the engine compartment as the air in the engine compartment is warmer (heated by the engine 102) than the outside air. It is known that drawing heated combustion air into the engine 102 negatively affects the operating/fuel efficiency of the engine 102.

To vent accumulated dust and debris 122 from the air cleaner 104, in FIG. 1 a rotary dust valve 126 according to the prevent invention is advantageously provided and mounted preferably at a low point of the dirty air side 106 of the air cleaner 104. Preferably the rotary dust valve 126 is positioned such that the inlet port 128 is positioned in elevation above the outlet port 130 such that dust/debris 122 is able to enter the inlet port 126 and exit the outlet port 130 under the motive influence of gravity.

As the air cleaner 104 typically operates at a slight vacuum relative to outside air, and due to the fact that it is undesirable to permit air to flow in a reverse direction (i.e. from outlet port 130 to inlet port 128) to enter the air cleaner 104, the rotary dust valve 126 is configured to maintain a continuous air lock closure between the outlet port 130 and the inlet port 128, as will be described further below.

Figure 2A:
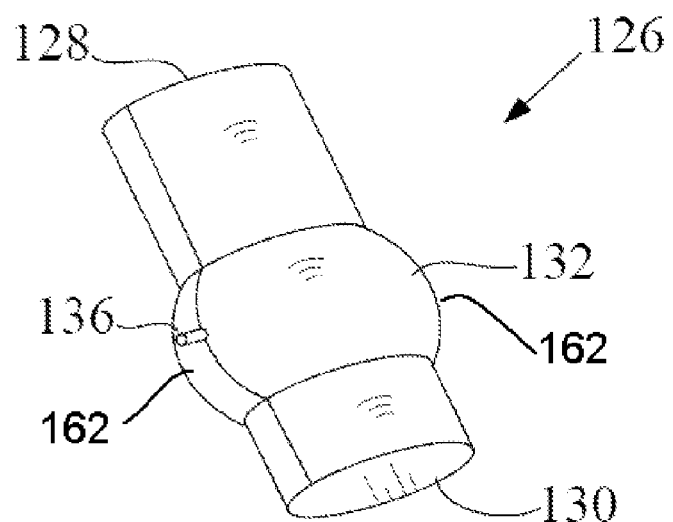
FIG. 2A depicts a perspective view of a rotary dust valve, consistent with the present invention.

FIG. 2A depicts a perspective view of a rotary dust valve 126 according to at least one aspect of the present invention. A convex curved valve body 132 that in some aspects of the invention may be spheroidally shaped (as depicted in FIG. 2A) is provided with an inlet port 128 and an opposing outlet port 130. In preferred aspects of the invention the inlet port 128 may have the configuration of a cylindrical pipe section configured for connecting and mounting to a complimentary cylindrical fitting on the air cleaner 104.

Figure 2B:
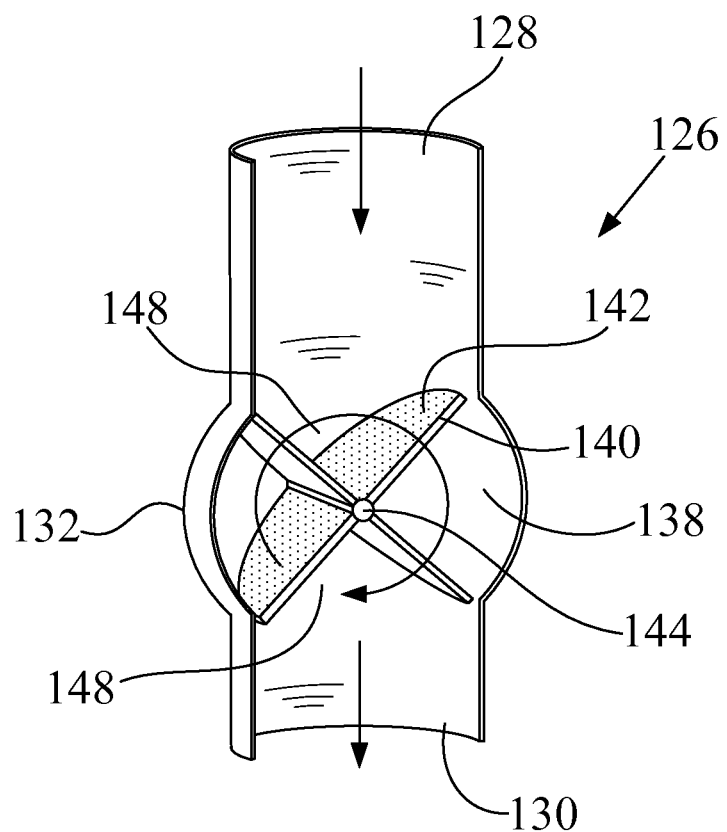
FIG. 2B is a side sectional view of the rotary dust valve presented in FIG. 2A.

FIG. 2B is a side sectional view of the rotary dust valve 126 presented in FIG. 2A, illustrating a substantially spherical rotor chamber 138 provided within the valve body 132. A rotary dust ejection member 140 is disposed and rotatably supported with the rotor chamber 138. The rotary dust ejection member 140 includes a plurality of fin members 142 secured to a hub member 144. The hub member is positioned along an axis of rotation 146 about which the hub member 144 may rotate. Fin members 142 are each secured to the hub member 144 such that fin members 142 rotate in unison about the axis or rotation 146. The fin members 142 share a common size and shape.

Advantageously, the rotor chamber 138 is shaped and configured in a complimentary fashion with the fin members 142 so as to provide a continuous closure between the inlet port 128 and the outlet port 130 in all positions of rotation of the rotary dust ejection member 140 about the axis 146, thereby providing pressure and air flow separation between the inlet port 128 and outlet port 130. Outer edges of the fin members 142 sweep out a contour as they rotate. The air lock closure between the inlet port 128 and outlet port 130 is accomplished by sizing and shaping the rotor chamber 138 such that the clearance between the fin members 142 (swept contour of) and the rotor chamber 138 is minimal but sufficient that the fin members 142 do not inter or contact the interior of the rotor chamber 138 as they rotate.

Any two adjacent fin members taken together (a fin member pair) define a dust pocket 148 therebetween. In general, a quantity 'n' of fin members will define a like quantity 'n' of dust pockets 148 in the rotary dust ejection member 140. In any rotational position of the rotary dust ejection member 140, at least one dust pocket is aligned in a first position in which it is in opened communication with the inlet port 128 and thereby positioned to receive dust/particulates 122 from the inlet port 128 and accumulate the dust in the input port aligned dust pocket 148. As the dust/particulate 122 mass accumulates in the input port aligned dust pocket 148, the dust ejection member 140 becomes unbalanced or 'top heavy' and is urged by the action of gravity to rotate about the axis 146 into a second position in which the dust laden dust pocket 148 then aligns to open to the outlet port 130, at which the accumulated dust/particulates 122 are discharged to the outside by the action of gravity.

Advantageously, the operation of the engine 102 provides a stream of pressure pulses in the air intake tract 100 that may further act to vibrate or actuate the rotary dust ejection member 140, the vibration further aiding the rotation of the rotary dust ejection member 140 after it becomes unbalanced or top heavy due to accumulation of particulates 122. Operation of the engine 102 may by itself provide mechanical vibration additionally operative to aid rotation of a dust laden rotary dust ejection member 140. As such, the rotary dust valve 126 is preferably (although, not necessarily) self operating and preferably does not require an external drive means to operate the rotary dust ejection member 140 to eject particulates 122 from the air cleaner 104 to the outside.

Advantageously in some embodiments a drive means, such as an electric motor drive or a vacuum motor, may be coupled to the rotary dust ejection member 140 to aid in the ejection of particulates 122 from the air cleaner 104.

Advantageously, in preferred embodiments the rotary dust ejection member 140 is freely rotatable within the rotor chamber 138.

Advantageously, the rotary dust valve 126 of the present invention provides a low cost, self actuating dust ejection valve that further advantageously provides an air lock between the engine air cleaner 104 and the outside environment.

Figure 2C:
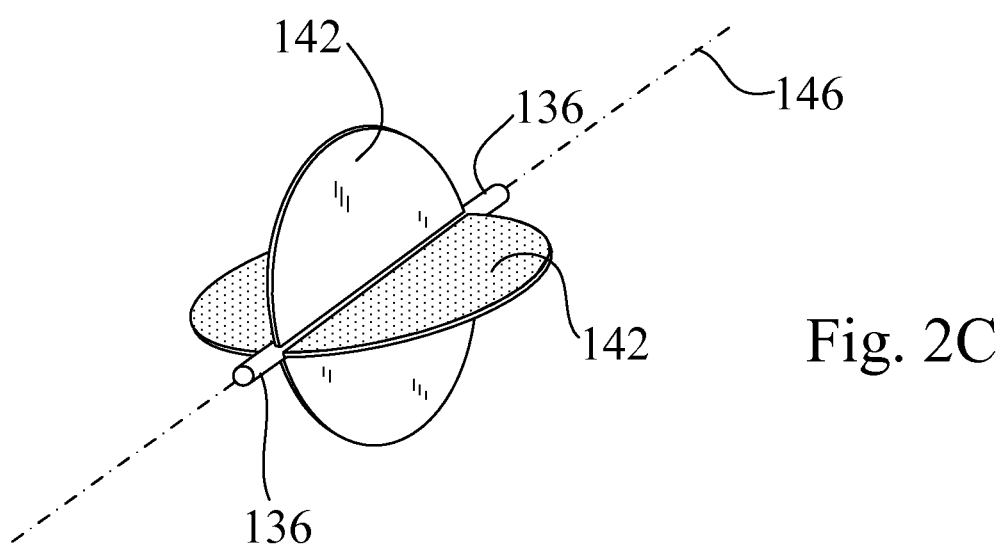

FIG. 2C is a perspective view of one embodiment of a rotary dust ejection member 140. In the embodiment illustrated in FIG. 2C, the fin members 142 extend radially outwards from the hub member 144. The hub member 144, on its opposing ends, is provided with cylindrical shaft portions 136 configured to rotatably support the rotary dust ejection member 140 within the rotor chamber 138. The rotary dust ejection member embodiment of FIG. 2C may be utilized with the rotary dust valve 126 of FIG. 2A, in which the shaft or shafts 136 extend through and receive support from opposing sidewalls of the rotor chamber 138.

In the embodiment illustrated in FIG. 2C, the shaft is provided as cylindrical portions extending from opposing ends of the hub member 144.

In alternate embodiments, (see FIG. 2D), the shaft 136 may be realized as a separate component extending through a central portion of the hub member 144 and having a length "L" selected to extend between and receive support from opposing sidewalls 162 (see FIG. 2A) of the rotor chamber 138. In some alternate embodiments, the hub member 144 includes a sufficiently sized bore 160 such that the hub member 144 is free to rotate on the shaft 136. In other alternate embodiments, the hub member 144 may be fixedly secured to the shaft 136 such that the hub member 144 rotates in unison with the shaft 136. In this case the shaft 136 is rotatably supported at opposing shaft ends by the opposing sidewalls 162 (see FIG. 2A) of the rotor chamber 138.

In an aspect of the invention illustrated in FIG. 2C, the fin members 142 are substantially planar and arranged at equal angular increments about the hub member 144 relative to the axis of rotation 146. Although this is a preferred embodiment, it should be evident that the fin members 142 may be provided with other non-planar shapes without deviating from the principles of the inventive disclosure presented herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:
1. A rotary dust valve, comprising:
 a valve body having an inlet port, an outlet port and a rotor chamber interposed therebetween;

wherein the inlet port is a cylindrical pipe section configured for connecting and mounting to a complimentary cylindrical fitting of an air cleaner;

wherein the dust valve is arranged such that the inlet port is positioned in elevation above the outlet port such that dust/debris is able to enter the inlet port and exit the outlet port under the motive influence of gravity;

a rotary dust ejection member having:

a fixed axis of rotation extending through a central portion of said rotor chamber;

a hub member rotatably supporting said rotary dust ejection member to rotate in said rotor chamber about said axis of rotation;

a plurality of fin members, each fin member extending radially outwards from and secured to said hub member, said fins sharing a common size and shape, said fin members angularly spaced apart on said hub relative to said axis and configured to rotate in unison about said axis, wherein adjacent pairs of said fin members define at least one dust pocket therebetween;

wherein the plurality of fin members define a same number of dust pockets;

wherein said fin members are arranged such that as said fin members rotate about said axis, at least one of said dust pockets open to said inlet port when in a first position and open to said outlet port when in a second position, each of said dust pockets opening to no more than one of said ports at a time;

wherein said dust pockets are configured to receive dust from said inlet port when in said first position and to discharge dust through said outlet port when in said second position;

wherein a first one of the at least one dust pocket is aligned in the first position in which it is in opened communication with the inlet port and positioned to receive dust from the inlet port and accumulate the dust in the first dust pocket;

wherein as dust mass accumulates in the first dust pocket, the dust ejection member becomes top heavy unbalanced due to accumulated dust mass and is urged by the action of gravity and/or vibration alone to rotate into the second position in which the first dust pocket aligns to open to the outlet port and discharge the accumulated dust;

wherein said rotor chamber and said fin members are cooperatively shaped and configured such that as said fin members rotate about said axis within said chamber, air flow separation between said inlet and outlet ports is provided;

wherein said rotor chamber is spheroidally shaped;

wherein said plurality of fin members are shaped complimentary to said rotor chamber;

wherein said plurality of fin members are rotatably supported in said rotor chamber on a shaft extending through and receiving support from opposing sidewalls of said rotor chamber;

wherein clearance between said fin members and said rotor chamber is sufficient that said fin members do not interfere or contact interior walls of said rotor chamber as they rotate;

wherein free rotation of said fin members is self actuating such that said fin members freely rotate in unison about said axis such that dust buildup in said dust pocket in said first position unbalances said dust ejection member causing rotation of said dust ejector member by gravity and/or vibration alone to rotate said duct pocket with buildup into said second position to discharge said dust buildup through said outlet port.

2. The rotary dust valve according to claim 1, wherein said fin members are angularly positioned about said axis for uniform angular displacement between adjacent fin members.

3. The rotary dust valve according to claim 1, further comprising cylindrical shaft portions extending axially from opposing ends of said hub member, said shaft portions sized to extend to and receive support from opposing sidewalls of said rotor chamber.

4. The rotary dust valve according to claim 1, wherein said shaft has a length selected to extend between and receive support from opposing sidewalls of said rotor chamber, wherein said shaft is aligned with said axis, wherein said shaft extends through an axially aligned bore in said hub member.

5. The rotary dust valve according to claim 4, wherein said hub and fin members rotate upon said shaft.

6. The rotary dust valve according to claim 4, wherein said shaft rotatably supports said hub and fin members on said opposing sidewalls.

7. The rotary dust valve according to claim 1, wherein said fin members are planar.

8. The rotary dust valve according to claim 1, wherein said dust valve is positioned with said inlet port positioned vertically above said outlet port.

9. The rotary dust valve according to claim 1, wherein said inlet port is connected to an air cleaner of an internal combustion engine.

* * * * *